United States Patent
Serban et al.

(10) Patent No.: US 9,876,854 B2
(45) Date of Patent: *Jan. 23, 2018

(54) DATA ROUTING IN A CONTENT DISTRIBUTION NETWORK FOR MOBILITY DELIVERY

(71) Applicant: AT&T Intellectual Property I, L.P., Atlanta, GA (US)

(72) Inventors: Cristina Serban, Middletown, NJ (US); Gustavo De Los Reyes, Fair Haven, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/240,708

(22) Filed: Aug. 18, 2016

(65) Prior Publication Data

US 2016/0359962 A1 Dec. 8, 2016

Related U.S. Application Data

(63) Continuation of application No. 14/196,806, filed on Mar. 4, 2014, now Pat. No. 9,450,828, which is a
(Continued)

(51) Int. Cl.
*G06F 15/173* (2006.01)
*H04L 29/08* (2006.01)
(Continued)

(52) U.S. Cl.
CPC ......... *H04L 67/1008* (2013.01); *H04L 41/12* (2013.01); *H04L 67/2814* (2013.01);
(Continued)

(58) Field of Classification Search
CPC ..................................................... H04L 41/12
(Continued)

(56) References Cited

U.S. PATENT DOCUMENTS

| 8,019,886 B2 | 9/2011 | Harrang et al. |
| 2009/0046637 A1* | 2/2009 | Kim ........................ H04W 4/06 370/329 |

(Continued)

OTHER PUBLICATIONS

Office Action dated Mar. 7, 2012 for U.S. Appl. No. 12/637,939, 25 pages.
Office Action dated Aug. 15, 2012 for U.S. Appl. No. 12/637,939, 27 pages.
(Continued)

*Primary Examiner* — Glenford Madamba
(74) *Attorney, Agent, or Firm* — Amin, Turocy & Watson, LLP

(57) ABSTRACT

Data is routed within a network of content with specific service constraints to mobile devices. A mobile network management component receives an identifier (ID) of a base station that serves a mobile device that originates a request for data, and relays the ID to a network platform that administers content. A mapping that associates one or more base stations with a deployed content node and the received ID are utilized to identify a content node to serve the request for data via the base station. The received request for data is directed to the identified content node. A service constraint configuration can be allocated for exchange of payload data between the mobile device and the network platform. For a request to consume data and a request to supply data, identified content node delivers data and receives data, respectively, in accordance with the service constraint allocation.

20 Claims, 8 Drawing Sheets

Related U.S. Application Data continuation of application No. 12/637,939, filed on Dec. 15, 2009, now Pat. No. 8,775,502.

(51) Int. Cl.
*H04W 4/00* (2009.01)
*H04L 12/24* (2006.01)
*H04W 88/08* (2009.01)

(52) U.S. Cl.
CPC ........... *H04W 4/00* (2013.01); *H04L 67/1097* (2013.01); *H04L 67/18* (2013.01); *H04L 67/322* (2013.01); *H04W 88/08* (2013.01)

(58) Field of Classification Search
USPC ....................................................... 709/223
See application file for complete search history.

(56) References Cited

U.S. PATENT DOCUMENTS

| | | | |
|---|---|---|---|
| 2010/0118758 A1* | 5/2010 | Brandt | H04L 12/189 370/312 |
| 2011/0131290 A1* | 6/2011 | Kim | G06F 17/30029 709/217 |
| 2011/0219226 A1* | 9/2011 | Olsson | G06F 21/6245 713/150 |

OTHER PUBLICATIONS

Office Action dated Feb. 11, 2016 for U.S. Appl. No. 14/196,806, 37 pages.

\* cited by examiner

DATA ROUTING IN A CONTENT DISTRIBUTION NETWORK FOR MOBILITY DELIVERY

CROSS-REFERENCE TO RELATED APPLICATION

This application is a continuation of, and claims priority to each of, U.S. patent application Ser. No. 14/196,806, filed on Mar. 4, 2014, and entitled "DATA ROUTING IN A CONTENT DISTRIBUTION NETWORK FOR MOBILITY DELIVERY", now issued as U.S. Pat. No. 9,450,828, which is a continuation of U.S. patent application Ser. No. 12/637,939, filed on Dec. 15, 2009, and entitled "DATA ROUTING IN A CONTENT DISTRIBUTION NETWORK FOR MOBILITY DELIVERY", now issued as U.S. Pat. No. 8,775,502. The entireties of the above noted applications are hereby incorporated herein by reference.

TECHNICAL FIELD

The subject disclosure relates generally to communication networks and, more specifically, to networked distribution of content or data with specific service constraints to mobile devices.

BACKGROUND

A content distribution network (CDN) deploys a large number of servers in geographically distributed areas, content (e.g., web pages, files, email messages, media . . . ) from a content provider can be cached in the deployed servers, so that the content can be delivered efficiently and quickly to end-users in response to a request for data therefrom. Delivery of cached content generally can avoid delays due to slow transport or congested backhaul links at the time of the request, and can prevent overload of the content provider's servers if the number of requests for data is substantive. In a conventional CDN, content is made available to end-users according to the end-users' location within a space of logical addresses, such as internet protocol (IP) addresses, for the mobile device, as well as other factors, such as network load, e.g., cache server's load, or other parameters relevant to the content provider's preferences. The conventional CDN utilizes information on the IP address of a device associated with the end-user, as well as the other parameters to determine a cache server, or CDN node, from which a request for data from an end user is to be served.

When the device from which an end-user requests for data, e.g., content, from the conventional CDN is a mobile device, such as a phone, the request for content is delivered from the mobile phone to a nearby base station of a mobile service provider in the geographical area in which the mobile device operates. From the base station, the request is sent over the service provider's core network to an access network, such as the Internet, through which the request for data is delivered to the conventional CDN. As indicated supra, the CDN determines to which CDN node to send the request for data based primarily on the IP address of the end-user's device, namely, the IP address of the mobile phone. Since such IP address is assigned dynamically when the mobile device initiates a data session, e.g., connects to the internet, substantial signaling is incurred as a result of routing data from the CDN to the mobile device, with the ensuing increase in control traffic and processing at the CDN servers, which thus renders conventional data routing in CDN largely inefficient.

DETAILED DESCRIPTION

Figure 1:
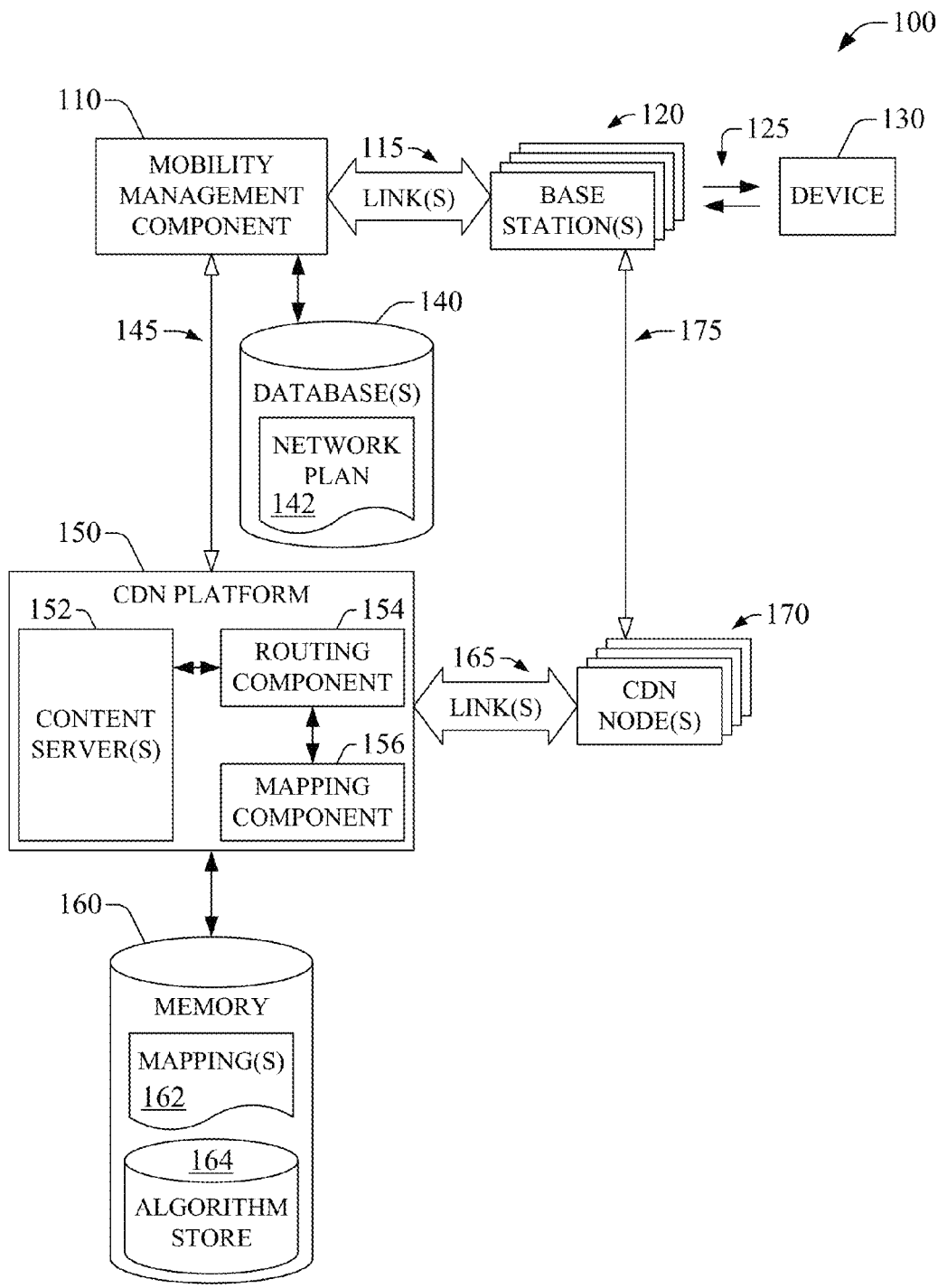
FIG. 1 is a block diagram of an example system that enables routing of content in a content distribution network (CDN) in accordance with aspects described herein.

The subject disclosure is now described with reference to the drawings, wherein like reference numerals are used to refer to like elements throughout. In the following description, for purposes of explanation, numerous specific details are set forth in order to provide a thorough understanding of the various embodiments of the subject disclosure. It may be evident, however, that the subject disclosure may be practiced without these specific details. In other instances, well-known structures and devices are shown in block diagram form in order to facilitate describing the various embodiments of the subject disclosure.

As used in this application, the terms "component," "system," "platform," "layer," "node," "interface," and the like are intended to refer to a computer-related entity or an entity related to an operational apparatus with one or more specific functionalities, wherein the computer-related entity and the entity related to the operational apparatus can be either hardware, a combination of hardware and software, software, or software in execution. One or more of such computer-related entities or entities related to the operational apparatus are also referred to herein as "functional elements." As an example, a component may be, but is not limited to being, a process running on a processor, a processor, an object, an executable, a thread of execution, a program, and/or a computer. By way of illustration, both an application running on a server or network controller, and the server or network controller can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software, or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, layer, node, interface, and the like.

Various aspects of the subject disclosure are presented in terms of systems or embodiments that may include a number of components, modules, nodes, interfaces, platforms, or the like. It is to be understood and appreciated that the various systems or embodiments may include additional components, modules, etc. and/or may not include all of the components, modules, nodes, interfaces, platforms, etc. discussed in connection with the annexed drawings. A combination of these approaches may also be used.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "Node B," "evolved Node B (eNode B)," and the like, are utilized interchangeably in the subject disclosure, and refer to a wireless network component or apparatus that at least delivers and receives data, control, voice, video, sound, gaming, or substantially any or any data stream or signaling stream. Sources or recipients of such data, control, voice, video, sound, gaming, or substantially any or any data stream or signaling stream can be at least a set of network components such as, but not limited to, user equipment, customer premises equipment, or network servers, controllers, gateways or management components. Data and signaling streams can be packetized or frame-based flows or circuit-switched streams of information.

Furthermore, the terms "end user," "subscriber," "customer," "consumer," "prosumer," "agent," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms) which can provide simulated vision, sound recognition and so forth. When utilized, the term "prosumer" indicates the following contractions: professional-consumer and producer-consumer.

Further yet, the term "set" as employed herein excludes the empty set. Thus, a "set" in the subject disclosure includes one or more elements or entities. As an illustration, a set of base stations includes one or more base stations, a set of content distribution network (CDN) nodes includes one or more CDN nodes, or the like.

It is noted that features or aspects described in the subject disclosure can rely, at least in part, on delivery or reception of indication(s), directive(s), request(s), or the like, and information or payload data (e.g., content(s)) associated therewith. Indication(s), directive(s), or request(s) can be embodied in multi-bit words (e.g., P-bit words, with P a positive integer) and coded to specifically convey a request(s) to a particular functional element (e.g., a CDN node) in order to execute specific operation(s) or configure particular service(s) (e.g., quality of service (QoS) configuration). Information or payload data within signaling, and request(s) or indication(s) conveyed therein, can be embodied, for example, in one or more reserved bits in a packet header, a light-payload (e.g., of the order of 1 byte) data packet, a predetermined multi-bit word conveyed in a control channel, a light-payload file (e.g., a cookie file), an email communication, an instant message, or the like. In addition, directive(s), request(s), indication(s), or the like, as described herein, can be delivered in accordance with various protocols. As an example, the various protocols can include at least one of file transfer protocol (FTP), secure shell FTP (SFTP), FTP over secure socket layer (FTPS), short message service (SMS) protocol, multimedia messaging service (MMS) protocol, unstructured supplementary service data (USSD) standard, simple network management protocol (SNMP), lightweight directory access protocol (LDAP), session initiation protocol (SIP), Open Mobile Alliance (OMA) device management (DM) protocol, Technical Report 069 (TR-069) protocol, also referred to as Customer Premise Equipment (CPE) Wide Area Network (WAN) Management Protocol or CWMP, or the like.

Additionally, various aspects of the subject disclosure are presented in terms of systems or embodiments that may include a number of components, modules, nodes, interfaces, platforms, or the like. It is to be understood and appreciated that the various systems or embodiments may include additional components, modules, etc. and/or may not include all of the components, modules, nodes, interfaces, platforms, etc. discussed in connection with the annexed drawings. A combination of these approaches may also be used.

One or more embodiments of the subject application provide data routing or organization of data exchange in a network of content for mobility delivery. The one or more embodiments can allow optimization of performance of data exchange amongst a mobile device and the network of content, e.g., content distribution network. In the alternative, such data exchange can be conducted within a satisfactory level of performance. In an aspect, the network of content is embodied in a content distribution network (CDN) which comprises a CDN platform and a set of remotely deployed CDN nodes; one or more CDN nodes in the set are operationally linked to one or more base stations. To route or organize data exchange, a mobile network management component, which can reside within a core network of a cellular wireless network or a service network external to the wireless network, receives an identifier (ID) of a base station that serves a mobile device that originates a request for data. The request for data can be a request to consume content or to supply content. The mobile network management component relays the ID to a network platform that administers content, e.g., the CDN platform. A routing component within the network platform identifies a content node, e.g., a CDN node, through a mapping that associates one or more base stations with a deployed content node, and the received ID; the identified content node serves the request for data. In addition, the routing component can allocate a service constraint, or quality of service (QoS), configuration, for exchange (e.g., transmission or reception) of payload data between the mobile device and the network platform. To serve data, or content, to the mobile device, the identified CDN node receives the request for data and the service constraint configuration. For a request to consume data and a request to supply data, identified content node delivers data and receives data, respectively, in accordance with the service constraint allocation.

Aspects, features, or advantages of the subject disclosure can be exploited in substantially any or any wireless telecommunication or radio technology. Non-limiting examples of such technologies or networks include Femtocell technology, Wi-Fi, Worldwide Interoperability for Microwave Access (WiMAX); Enhanced General Packet Radio Service (Enhanced GPRS); Third Generation Partnership Project (3GPP) Long Term Evolution (LTE); 3GPP Universal Mobile Telecommunications System (UMTS); Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); Global System for Mobile Communication (GSM) Enhanced Data Rate for GSM Evolution (EDGE) RAN or GERAN; UMTS Terrestrial Radio Access Network (UTRAN); or LTE Advanced.

To the accomplishment of the foregoing and related ends, the subject disclosure, then, comprises the features hereinafter fully described. The following description and the annexed drawings set forth in detail certain illustrative aspects of the various disclosed embodiments. However, these aspects are indicative of but a few of the various ways in which the principles of the subject disclosure may be employed. Other aspects, advantages and novel features of the various embodiments disclosed herein will become apparent from the following detailed description of such various embodiments when considered in conjunction with the annexed drawings.

As described in greater detail below, one or more embodiment of the subject disclosure can enable data routing within a network of content with specific service constraints to mobile devices. The one or more embodiments can allow optimization of performance of data exchange amongst a mobile device and the network of content, e.g., content distribution network. In the alternative, such data exchange can be conducted within a satisfactory level of performance. A mobile network management component receives an identifier (ID) of a base station that serves a mobile device that originates a request for data, and relays the ID to a network platform that administers content. A mapping that associates one or more base stations with a deployed content node and the received ID are utilized to identify a content node to serve the request for data via the base station. The received request for data is directed to the identified content node. A service constraint configuration can be allocated for exchange of payload data between the mobile device and the network platform. For a request to consume data and a request to supply data, identified content node delivers data and receives data, respectively, in accordance with the service constraint allocation.

To route data and regulate (e.g., increase) service constraints, or quality of service (QoS), the one or more embodiments described herein advantageously exploit aspects or features that are intrinsic to, yet not limited to, interaction amongst a content distribution network (CDN) and a mobile network. In particular, though not exclusively, aspects or features include the following. (1) End-user data, e.g., traffic, and control data, e.g., signaling, in mobile communications are transmitted or received through a base station administered by a telecommunication carrier or mobile service provider, wherein the location of the base station which is fixed in geographical location. (2) CDN nodes also are in fixed or substantially static in geographical locations, and deployment density of CDN nodes (number of commissioned CDN nodes per unit area) is generally lower than deployment density of base stations (e.g., number of provisioned and active base stations per unit area).

With reference to the drawings, FIG. 1 is a block diagram of an example system 100 that enables routing of content in a content distribution network (CDN) based in part on base station deployment information. In the subject example system 100, a mobility management (MM) component 110 is functionally connected through link(s) 115 to base station(s) 120, which comprises a set of one or more base stations deployed in a macrocellular coverage area. In an aspect, mobility management component 110 can be embodied in a gateway node (e.g., Gateway GPRS Support Node (GGSN)), a Serving GPRS Support Node (SGSN), Mobility Management Entity (MME)), a Session Border Control (SBC) node, an application server, or the like. Accordingly, in one or more embodiments, MM management component 110 can include a processor that executes code instructions to provide, at least in part, the functionality described herein. One or more base stations within base station(s) 120 can receive a request for data from a device 130, mobile or otherwise, which can communicate wirelessly, through wireless link(s) 125, with the one or more base stations; the request for data can be at least one of a request to consume (e.g., download) data or a request to supply (e.g., upload) data. At least the one or more base stations that receive the request for data can serve it, e.g., deliver or receive content, e.g., payload data, in response to the request for data. To receive or deliver data (e.g., traffic, signaling), in an aspect, the one or more base stations, which are part of base station(s) 120, can include a communication platform and associated circuitry and antenna(s), a processor, and a memory, wherein the processor can execute code instructions retained in the memory in order to provide the functionality of the base station as described herein. In addition, the circuitry associated with the communication platform, via at least in part the processor, can process (e.g., modulate, demodulate, multiplex, demultiplex, . . . ) signal(s) received, or to be conveyed, through the antenna(s) in the communication platform. Processing of the signal(s) can proceed in accordance with one or more telecommunication protocols associated with one or more radio technologies, such as those indicated supra.

A content distribution network (CDN) provides the served content, or payload data. In an aspect of the subject disclosure, the content distribution network comprises a CDN platform 150 functionally connected to MM component 110 through an interface 145, and CDN node(s) 170, which comprises a set of CDN nodes deployed in one or more geographical areas. Interface 145 can include at least one of a conventional wired link, a wireless link, or a reference link and associated component(s). In one or more embodiments, interface that can include at least one of a conventional wired link, a wireless link, or a reference link and associated component(s). Link(s) 165 functionally connect CDN platform 150 to CDN node(s) 170. In addition, CDN node(s) 170 are functionally connected to base station(s) 120 through one or more interfaces 175, which can include at least one of a conventional wired link, a wireless link, or a reference link and associated component(s).

To deliver content to or receive content from device 130, the CDN utilizes information on deployment of base station(s) 120 and relationship(s) between the deployment of the base station(s) 120 and CDN nodes 170. The relationship(s) can allow optimization of communication amongst device 130 and the CDN through optimization of selection of a CDN node to serve a request for data. In an aspect, CDN platform 150 exploits, at least in part, content server(s) 152 in addition to routing component 154 and mapping component 156. While in example system 100 content server(s) 152 are illustrated as external to routing component 154 and mapping component 156, in one or more embodiments, one or more of routing component 154 and mapping component 156 can be included within one or more content server(s). Routing component 154 receives a request for data from mobility management component 110, and exploits a mapping that associates a set of base stations (e.g., base station(s) 120) in a wireless macrocellular network with deployed CDN node(s) 170 to identify or to select a CDN node that can serve, at least in part, the request for data. As an example, routing component 154 can inspect a look-up table that embodies the mapping and is retained in memory 160 within mapping(s) 162; to inspect such look-up table, routing component 154 can execute, at least in part, code instructions (not shown) retained in memory 160. In one or more additional or alternative embodiments, mapping component 156 can be configured to identify or select, or can identify or select, the CDN node that can serve, at least in part, the request for data. In such one or more embodiments, the mapping component 156 can supply an identification of the identified or selected CDN node to routing component 154. The identification can be supplied in response to a request from routing component 154 to identify or select a suitable CDN node to serve a request for data.

After a suitable CDN node has been selected or identified, routing component 154 directs the request for data to the selected or identified CDN node. When device 130 is a mobile device, it should be appreciated that the subject routing effected by routing component 154 transforms the problem of dealing with a logical address (e.g., internet protocol (IP) address) allocated to device 130 and that changes due to mobility thereof to dealing with a fixed or substantially fixed logical address (e.g., IP address) of the base station that serves the device 130, wherein the logical address of the base station and a serving CDN node linked thereto can be readily extracted from the aforementioned mapping, e.g., a look-up table.

The request for data received by routing component 154 can be a request to supply data or to consume data, and can include an identifier (ID) for the base station within base station(s) 120 that receives the request for data from device 130. In one or more scenarios, a base station ID can be a composite entity that includes an internet protocol (IP) address of the base station in addition to a wireless network ID, e.g., cell identity, for the base station. In the mapping, a single logical address (e.g., internet protocol (IP) address) of a CDN node can be linked to one or more base station IDs. To identify or select a suitable CDN node, routing component 154 can access the mapping directly or via mapping component 156; the mapping can be retained in memory 160 within mapping(s) storage 162, also referred to herein and in annexed drawings are mapping(s) 162. To access the mapping via mapping component 156, routing component 154 can deliver a directive to provide data and receive the requested data from mapping component 156 in response to the directive. Routing component 154 can access the mapping when it executes, at least in part, routing algorithms or implements, at least in part, routing methods, which can include one or more of the example methods described herein. Routing algorithms or routing methods can be retained in algorithm store 164.

In another aspect of the subject disclosure, since the request for data conveys a base station ID and such conveyance indicates that a mobile device originates the request for data, routing component 154, via, e.g., a service configuration component (not shown), can configure a service constraint for exchange (e.g., delivery or reception) of payload data solicited in the request for data. The service constraint, or service constraint indication, can include a quality of service (QoS) class, or a predetermined bit rate or upper or lower bound thereof. In an illustrative scenario, to configure or generate a service constraint, routing component 154, through the service configuration component (not shown), for example, can (i) assess at least one of volume of data requested to be delivered (e.g., downloaded) or received (e.g., uploaded), subscriber class (e.g., business or personal) of device (e.g., 130) that originates the request for data, or network conditions (e.g., load, channel quality conditions), and (ii) determined a QoS class or bit rate to serve the request for data. To conduct such assessment, routing component 154, via service configuration component (not shown), can exchange data with MM component 110, which can access database(s) 140, to supply requested information, such as wireless network conditions or subscriber class. Routing component 154, e.g., via the service configuration component (not shown), can supply an indication of the service constraint, or QoS class, to at least one of a CDN node identified, or selected, as part of routing data in response to the request for data. The CDN node can relay the service constraint, or service constraint indication, to the base station that is associated with the CDN node in accordance with a mapping employed to route data in response to the request for data. Accordingly, routing component 154 can provide QoS to a mobile device, e.g., 130, that submits a request for data to a CDN. Providing QoS class, or service constraint(s), also can optimize data exchange, e.g., transmission, of data amongst the mobile device, e.g., 130, that submits the request for data and the CDN node that serves, at least in part, the request for data.

If a request for data is a request to consume, e.g., download, data, a CDN node within CDN node(s) 170 that is identified by routing component 154 based at least in part on a base station ID and a mapping can receive the request for data and a QoS configuration, and can transmit data solicited in the request for data, wherein the transmission is performed in accordance with the QoS configuration. The CDN node transmits the data to an associated base station within base station(s) 120 that serves telecommunication with device 130, the base station relays the data received from the CDN node to the device 130, which originated the request for data.

In the alternative, if the request for data is a request to supply data, e.g., upload data, a CDN node within CDN node(s) 170 that is identified by routing component 154 based at least in part on a base station ID and a mapping can receive the request for data and a QoS configuration and can deliver an indication to serve the request for data in accordance with the QoS configuration. Such indication is delivered to a base station that is associated with the CDN node, via the mapping, and serves telecommunication with device 130, which originated the request for data. The base station delivers a request for payload data consistent with the request for data, e.g., the request to upload data, and in response the device 130 provides the payload data. The base station receives the payload data and relays such data to the CDN node associated with the base station; the CDN node forwards the payload data to the routing component 154, which retains the data in a memory functionally coupled with a CDN platform (e.g., 154) or a content server (e.g., 152) that includes the routing component 154.

As indicated supra, the mapping characterizes the relationship(s) between the deployment of the base station(s) 120 and CDN nodes 170, and can provide identification or allow selection of a CDN node that is geographically closest or sufficiently geographically close (e.g., based in part on predetermined operation criteria) to a specific base station. A mapping is established before a request for data is served and can optimize performance or accomplish a satisfactory level of performance of service of the request for data via selection of CDN node associated with a base station that receives the request for data from device 130. In an aspect, performance optimization or performance within a satisfactory level can be measured against objective metrics such as a communication costs. Apart from temporary distribution network congestion or special service requests from an administration of the content, or the content owner, lowest communications costs for content to be delivered to a mobile device connected to a base station can be obtained if the CDN node closest to the base station is utilized to serve a request for data.

A mapping associates a base station(s) 120 to CDN node(s) 170 in a one-to-one relationship or a many-to-one relationship. In an aspect, many-to-one relationships within a mapping can be common because density of CDN node deployment can be typically lower than density of base station deployment. The mapping can be configured and upgraded as base station deployment or wireless network plan(s) are modified; however, in common scenarios, base station location and location of a related CDN node remains largely unchanged because a provisioned base station and a CDN node remains in substantially unchanged locations, or geographical loci. To generate a mapping, mapping component 156 can receive deployment information—e.g., information retained in network plan 142 in database(s) 140—from mobility management component 110 and associate such deployment information with knowledge of CDN node deployment or configuration within the CDN in order to form a mapping that associates one or more base stations with a geographically closest or sufficiently close CDN node. The deployment information can include base station identifiers (IDs), such as cell identities, which are generated at a time a base station is provisioned and activated in a macrocellular network. Mapping component 156 can commit a mapping to memory 160. In an aspect, database(s) 140 can be embodied in one or more of a Home Subscriber Server (HSS), a Home Location Register (HLR), a Visitor Location Register (VLR), a backend service database, or the like. Database(s) 140 can be functionally connected mobility management component 110 through an interface that can include at least one of a conventional wired link, a wireless link, or a reference link and associated component(s). In another aspect, network plan 142 can be updated at predetermined intervals or based on events such as updates to a wireless network that includes and administers MM component 110.

Features or aspects of the subject disclosure and one or more embodiments thereof have at least the following advantages with respect to conventional data routing in content distribution networks. (i) When compared to selection of a CDN node through calculation of location of a mobile device that originates a request for data based on the mobile device's allocated IP address, utilization of knowledge of deployment (e.g., location) of base stations in a macrocellular network reduces the time necessary to select a CDN node to serve a request for data. As indicated supra, deployment information can be largely static or it can be changed in time scales much larger than time scales in which IP address(es) of a mobile device is updated due to mobility. (ii) Optimization of selection of a CDN node to serve a request for data, e.g., deliver content requested by a mobile end-user, results in shorter fulfillment time, e.g., delivery time to the end-user, and therefore it can lead to improved end-user experience. (iii) Allocation, e.g., configuration and provisioning, of service constraint(s) or QoS for a device that communicates wirelessly and originates a request for data can result in shorter fulfillment time, e.g., delivery time from CDN to the end-user or upload time to CDN from end-user device, and therefore improved end-user experience. In general, at least the subject advantages can result in improved end-user experience, which can translate in increased end-user perceived quality of service with respect to the CDN service provider, e.g., an administrator of CDN platform 150 or CDN node(s) 170 and can generate a potential business differentiator.

Figure 2:
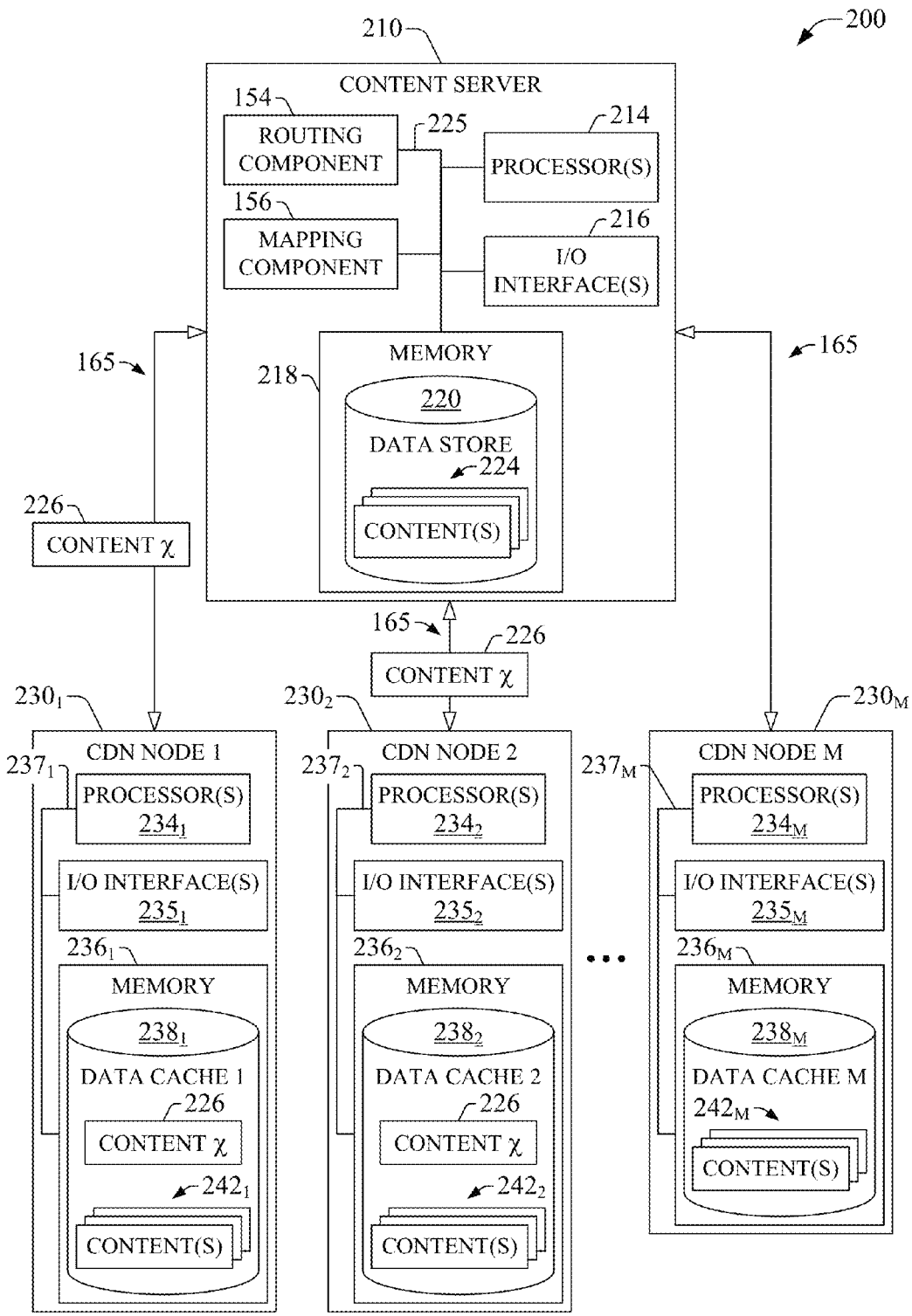
FIG. 2 illustrates diagrams of example embodiments of a content server that can be part of a CDN, and CDN nodes in accordance with aspects described herein.

FIG. 2 illustrates a diagram 200 of example embodiments of a content server that can be part of CDN platform 150 and CDN nodes in accordance with aspects described herein. Content server 210 can embody one or more of the content servers that are part of content server(s) 152 within CDN platform 150. In an aspect, content server 210 includes routing component 154 and mapping component 156, both of which can be configured to operate or can operate as described hereinbefore. As part of a CDN platform (e.g., 150), content server 210 can transmit at least a portion of content (e.g., media or other type of digital files) retained in data store 220 as part of content(s) 224 to one or more of CDN nodes $230_1$-$230_M$, with M a natural number; content(s) 224 retained in memory 218 can be supplied to end-user devices, mobile or otherwise, as part of a content supply service. The portion of content that is transmitted is cached or stored within a memory that is part of the CDN node that receives the portion of content. As an illustration, content $\chi$ 226 can embody the portion of content and can be delivered to CDN nodes $230_1$ and $230_2$ and retained, respectively, in data cache $238_1$ and data cache $238_2$. Content $\chi$ 226 so retained in CDN nodes $230_1$ and $230_2$ can be accessed by disparate end-user devices (not shown in FIG. 2). In such illustration, CDN nodes $230_3$ (not shown) through $230_M$ do not receive content $\chi$ 226. It is noted that other portions of content, e.g., content $\chi'$ (not shown), can be supplied to one or more of CDN nodes $230_1$-$230_M$. The various received portions of content can be retained as content(s) $242_1$-$242_M$ in respective CDN nodes $230_1$-$230_M$.

Content server 210 includes processor(s) 214 which can be configured to provide or can provide, at least in part, the described functionality of the various components or interface(s) within content service 210. In an aspect, I/O interface(s) 216 can enable, at least, networked connectivity; as an example, I/O interface(s) 216 can receive data or request(s) for data from MM management component 110 (not shown in FIG. 2) through interface 145. Moreover, in an aspect, I/O interface(s) 216 can be part of interface 145. To provide such functionality, processor(s) 214 can exploit bus 225 to exchange data or any other information amongst components within content server 210 and memory 218, or elements therein such as data store 220. Bus 225 can be embodied in at least one of a memory bus, a system bus, an address bus, a message bus, or any other conduit, protocol, or mechanism for data or information exchange among components that execute a process or are part of execution of a process. The exchanged information can include at least one of code instructions, code structure(s), data structures, or the like. Processor(s) 214 also can execute code instructions (not shown) stored in memory 218 to implement or provide at least part of the described functionality of content server 210, and routing component 154 and mapping component 156. Such code instructions can include program modules or software or firmware applications that implement specific tasks which can be accomplished through one or more of the methods described in the subject specification and that are associated, at least in part, with functionality of the various systems disclosed herein.

In one or more alternative or additional embodiment(s), processor(s) 214 can be distributed amongst components of content server 210. In further one or more alternative or additional embodiments, one or more components of content server 210 can be implemented as a software application or a firmware application and can reside within memory 218 as one or more sets of code instructions that, when executed by processor(s) 214, implement the one or more components and described functionality thereof.

In addition, CDN nodes $230_1$-$230_M$ include, respectively, processor(s) $234_1$-$234_M$, which can be configured to execute or can execute code instructions (not shown) retained within respective memories $238_1$-$238_M$ in order to provide the functionality of a CDN node as described herein. CDN nodes $230_1$-$230_M$ can include respective I/O interfaces $235_1$-$235_M$ that enable exchange (e.g., reception or delivery) of data amongst the CDN nodes $230_1$-$230_M$ and content server 210, and amongst CDN nodes $230_1$-$230_M$ and one or more base stations (not shown in FIG. 2). Link(s) 165 can be functionally coupled to I/O interfaces $235_1$-$235_M$. Data can be exchanged in accordance with one or more protocols, such as the protocols described supra. Moreover, I/O interfaces $235_1$-$235_M$ can include at least part of interfaces 175. In an aspect, in addition to content χ 226, such data can include request(s) for data, service constraint indication(s), and other information described herein. In addition, for a CDN node $230_K$, bus $237_K$ can enable information exchange amongst processor $234_K$, I/O interface $235_K$, and memory $238_K$, with K=1, 2, . . . M. Each bus $237_K$ can be embodied in substantially the same manner as bus 225.

Figure 3:
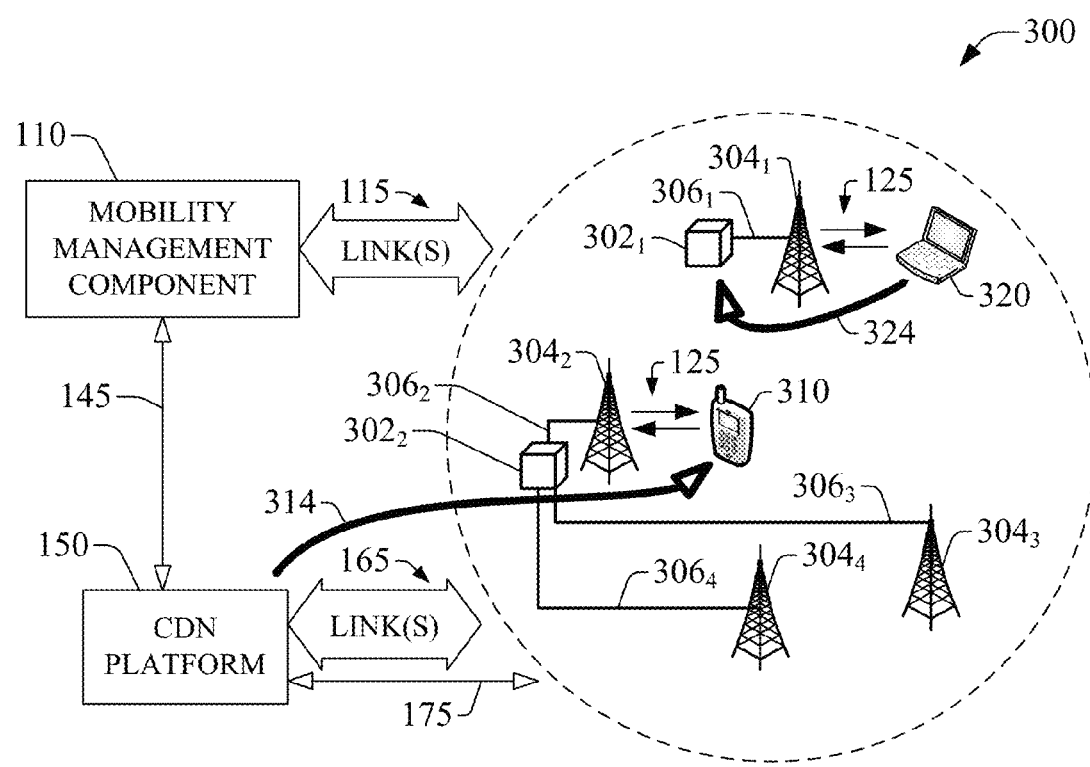
FIG. 3 is a diagram that illustrates example communication paths in an example environment that operates in accordance with aspects described herein.

FIG. 3 is a diagram that illustrates example communication paths in an example environment 300 that operates in accordance with aspects described herein. Two CDN nodes $302_1$ and $302_2$ are functionally connected, respectively, to a base station $304_1$ and a set of three base stations {$304_2$,$304_3$, $304_4$}; in a one-to-one relationship, CDN node $302_1$ connects to base station $304_1$ via an interface $306_1$, whereas in a many-to-one relationship, CDN node $302_2$ connects to base stations $304_2$,$304_3$,$304_4$ through respective interfaces $306_2$, $306_3$, and $306_4$. Interfaces $306_1$, $306_2$, $306_3$, and $306_4$ operate in the same or substantially the same manner as interface(s) 175. CDN nodes $302_1$ and $302_2$ are functionally coupled to CDN platform 150 via link(s) 165. In a first example scenario, device 310 downloads content from CDN platform 150. Communication path for such download of content is illustrated with arrow 314. As described supra, device 310 can submit a request for data through base station $304_2$, to which the device 130 is attached; the request for data is a request to consume data. In response to the request for data, and after an identity for base station $304_2$ has been received via mobility management component 110, CDN platform 150, or one or more components therein, can identify CDN node $302_2$ through a mapping that associates such CDN node with base station $304_2$. The mapping can be retained within a memory (e.g., 160) that is available, e.g., functionally connected to or integrated in, CDN platform 150. Further in response, requested data is delivered by CDN $302_2$ through base station $304_2$ as described supra.

In a second example scenario, device 320 uploads content to CDN platform 150. Communication path for content upload is illustrated with arrow 324. As described supra, device 320 can submit a request for data through base station $304_1$, to which device 320 is attached; the request for data is a request to supply data. In response to the request for data, and after an identity (e.g., cell identity) for base station $304_1$ has been received via at least in part mobility management component 110, CDN platform 150, or one or more components therein, can identify CDN node $302_1$ through a mapping (e.g., mapping 162) that logically links such CDN node to base station $304_1$. The mapping can be the same mapping exploited by CDN platform 150, or a component therein (e.g., routing component 154), to identify CDN node $302_2$ with one or more base stations $304_2$, $304_3$, or $304_4$. Further in response, requested data is delivered by CDN $302_2$ through base station $304_2$ as described supra.

Figure 4:
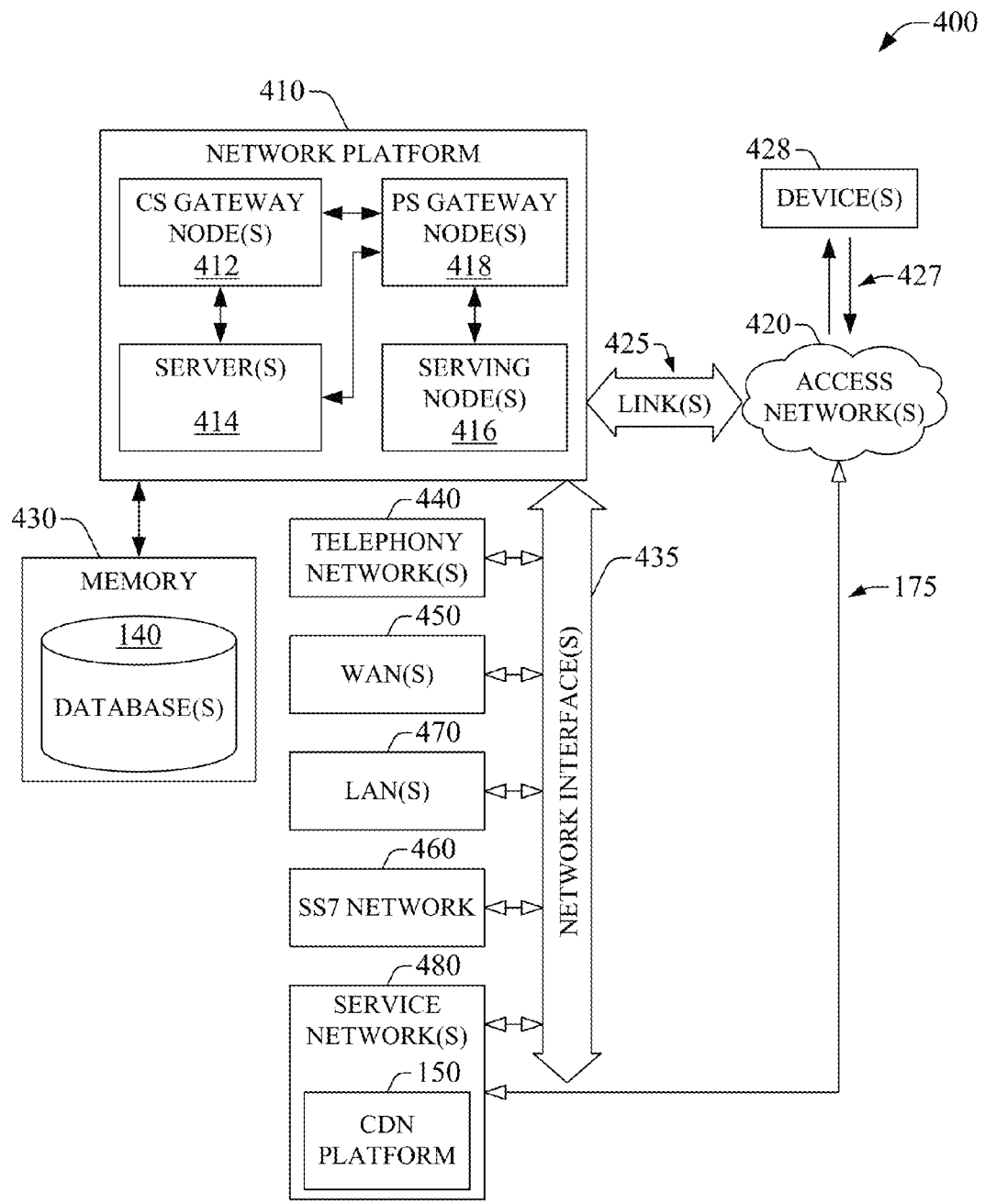
FIG. 4 presents a high-level block diagram of an example network environment in which aspects described herein can be implemented or exploited.

In order to provide additional context for the various embodiments of the subject disclosure, FIG. 4 presents a high-level block diagram of an example network environment in which aspects described herein can be implemented or exploited. Generally, network platform 410 can include one or more components, e.g., node(s), gateway node(s), interface(s), server(s), or platform(s) that enable both packet-switched (PS) (e.g., internet protocol (IP), frame relay, asynchronous transfer mode (ATM)) and circuit-switched (CS) traffic (e.g., voice and data) and control generation for networked communication, wireless or otherwise. In an aspect of the subject disclosure, a functional element within a PS domain of network platform 410 can embody MM component 110 as described herein; PS gateway node(s) 418 can embody at least part the PS domain. In an example scenario, the functional element within the PS domain can enable exchange of MS communications in one or more of the following transport protocols: MMS protocol, SIMPLE, XMPP, or IMPS protocol. With respect to CS communication, network platform 410 includes CS gateway node(s) 412, which can interface CS traffic received from legacy networks like telephony network(s) 440 (e.g., public switched telephone network (PSTN), or public land mobile network (PLMN)) or a SS7 network 460. CS gateway node(s) 412 also can enable exchange of MS communications in SMS protocol. In addition, CS gateway node(s) 412 can authorize and authenticate traffic (e.g., voice) arising from such networks. Moreover, CS gateway node(s) 412 can access mobility, or roaming, data generated through SS7 network 460; for instance, mobility data stored in a VLR, which can reside in memory 430. Furthermore, CS gateway node(s) 412 can interface CS-based traffic or signaling with PS gateway node(s) 418. As an example, in a 3GPP UMTS network, CS gateway node(s) 412 can be embodied, at least in part, in gateway GPRS support node(s) (GGSN).

In the subject disclosure, in addition to receiving and processing CS-switched traffic and signaling, PS gateway node(s) 418 can authorize and authenticate PS-based data sessions with device(s) 428, mobile or otherwise, served through access network(s) 420 via link(s) 425, wireless or wired (e.g., reference links), or wireless link(s) 427. Access network(s) 420 can include base station(s) 120 (not shown), to which CDN platform 150, which can be part of service network(s) 480, can connect via interface(s) 175. Data sessions can include traffic exchange with networks external to network platform 410, such as wide area network(s) (WAN(s)) 450 or service network(s) 480; local area network(s) (LAN(s)) 470 also can be interfaced with network platform 410 through PS gateway node(s) 418. In an aspect, such data sessions can include sessions that include requests for data and data delivery as described herein. Network interface(s) 435 enable the traffic exchange; such interface(s) can include conventional wired or wireless links, or reference links specific to each of the external network(s) that interface with the PS domain, e.g., PS gateway node(s) 418, of network platform. In an aspect, packet-switched gateway node(s) 418 can generate packet data protocol (PDP) contexts when a data session is established. To at least that end, in an aspect, PS gateway node(s) 418 can include a tunnel interface (e.g., tunnel termination gateway (TTG) in 3GPP UMTS network(s) (not shown)) which can facilitate packetized communication with disparate wireless network(s), which can be part of access network(s) 420 and can include Wi-Fi networks, femtocell network(s), macrocellular network(s) and associated radio access network(s) (RAN(s)) based on various radio technology generations, etc. It should be further appreciated that packetized communication can include multiple flows that can be generated through server(s) 414, such as management server(s) (e.g., a provisioning server) or application server(s). It is to be noted that in 3GPP UMTS network(s), PS gateway node(s) 418 (e.g., GGSN) and tunnel interface (e.g., TTG) comprise a packet data gateway (PDG).

In network environment 400, network platform 410 also includes serving node(s) 416 that conveys the various packetized flows of data streams that can be directed to device(s) 428, and that are received through PS gateway node(s) 418 from server(s) 414. In turn, server(s) 414 can receive the communication(s), such as request for data intended to service network(s) 480, or CDN platform 150 therein, from various device(s) (not shown). As an example, in a 3GPP UMTS network, serving node(s) 416 can be embodied in serving GPRS support node(s) (SGSN). As another example, in a 3GPP LTE network, service node(s) 416 can be embodied in a Mobility Management Entity (MME).

Server(s) 414 can operate in various layers of network platform 410, such as Operations Support Systems (OSS), Business Support Systems (BSS), or network sub-systems such as IMS core network, and can execute numerous applications, which can include consumer-oriented application(s), such as messaging services, location services, online gaming, wireless banking, or system-oriented applications, e.g., wireless device management, scheduling or queuing of network traffic, or the like. Such applications, consumer- or system-oriented can generate sets of packetized data streams or flows, and manage (e.g., schedule, queue, format . . . ) such flows. Such application(s), for example can include add-on features to standard services provided by mobile network platform 410. Data streams generated by server(s) 414, can be conveyed to PS gateway node(s) 418 for authentication/authorization and initiation of a data session, and to serving node(s) 416 for communication to device(s) 428 thereafter.

Server(s) 414 also can also effect security (e.g., implement one or more firewalls) of network platform 410 to ensure network's operation and data integrity in addition to authentication and authorization procedures that CS gateway node(s) 412 and PS gateway node(s) 418 can enact. In addition, server(s) 414 can implement timing protocols (e.g., Network Time Protocol (NTP)) that supply timing framework(s) for various operation(s) of network platform 410. Moreover, server(s) 414 can provision services from external network(s), e.g., WAN 450, IMS core network which can be part of service network(s) 480, or Global Positioning System (GPS) network(s) (not shown). Server(s) 414 can include one or more processors (not shown) configured to provide at least in part the functionality of network platform 410. To that end, the one or more processor can execute code instructions (not shown) stored in memory 430, for example.

In example network environment 400, memory 430 can store information related to operation of network platform 410. Information can include content(s), such as subscriber-generated content or from various other sources; subscriber account(s) and associated credential(s); pricing schemes, e.g., promotional rates, flat-rate programs, couponing campaigns; and so forth. Memory 430 can also store information from at least one of telephony network(s) 440, WAN(s) 450, LAN(s) 470, SS7 network 460, or service network(s) 480. As illustrated, memory 430 also can include database(s) 140. While illustrated as a single entity, memory 430 can be distributed amongst one or more of the described external networks, server(s) 414, or other functional elements of network platform 410.

In view of the example system(s) described above, example method(s) that can be implemented in accordance with the disclosed subject matter can be better appreciated with reference to FIGS. 5-9. For purposes of simplicity of explanation, methods disclosed herein are presented and described as a series of acts; however, it is to be understood and appreciated that the disclosed and claimed subject matter are not limited by the order of acts, as some acts may occur in different orders and/or concurrently with other acts from that shown and described herein. For example, one or more methods disclosed herein could alternatively be represented as a series of interrelated states or events, such as in a state diagram or call flows. Moreover, interaction diagram(s) or call flow(s) may represent one or more methods described herein in accordance with the disclosed subject matter when disparate entities enact disparate portions of the one or more methods. Furthermore, not all illustrated acts may be required to implement a described method in accordance with the subject specification. Further yet, two or more of the disclosed methods can be implemented in combination, to accomplish one or more features or advantages described herein.

Methods disclosed throughout the subject specification and annexed drawings are capable of being stored on an article of manufacture to facilitate transporting and transferring such methods to computers for execution, and thus implementation, by a processor or for storage in a memory, or computer-readable storage medium or machine-readable storage medium. In an aspect, one or more processors, such as processor(s) that enact the method(s) described herein, can be employed to execute code instructions retained in a memory, or any computer- or machine-readable medium, to implement method(s) described herein; the code instructions provide a computer- or machine-executable framework to enact the method(s) described herein.

Figure 5:
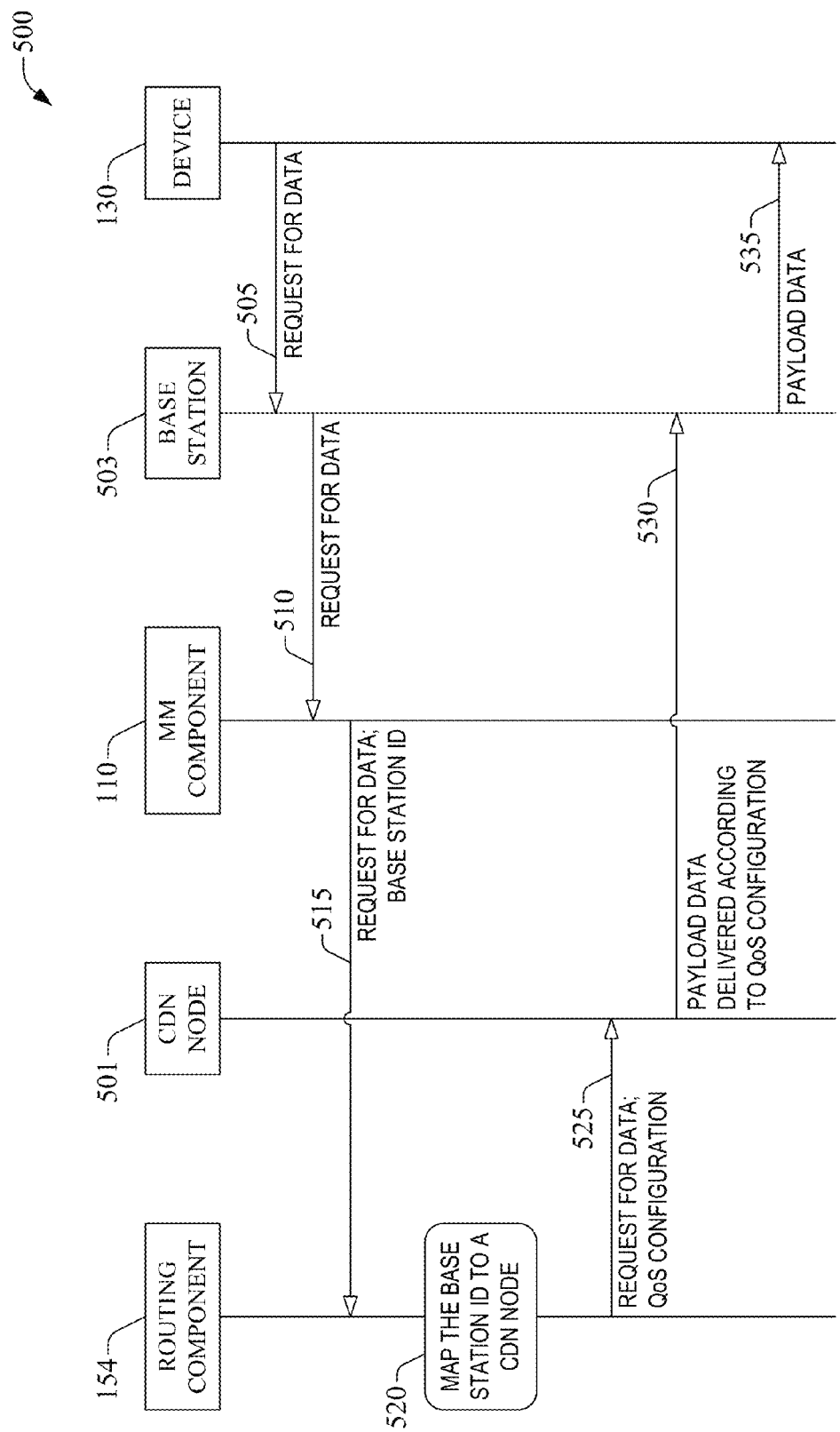
FIG. 5 is a call flow of an example method for providing data to a device, mobile or otherwise, in accordance with aspects described herein.

FIG. 5 is a call flow of an example method 500 for providing data to a device, mobile or otherwise, in accordance with aspects described herein. As illustrated, various functional elements of example system 100 can implement, at least in part, various acts includes in the subject example method 500. To provided data, or content (e.g., web-based content), device 130 delivers a request for data at act 505. The request for data is received by based station 503, which relays the data request to mobility management (MM) component 110 at act 510. The request for data can be tagged, or otherwise labeled or logically associated, with an identifier (ID), such as a cell identity for the base station that received the request for data from device 130. Mobility management component 110, at act 515, conveys the tagged request for data to routing component 154, which at act 520 maps the ID of the base station to a CDN node; in an aspect, such CDN node is deployed in geographical proximity of the base station 503 that receives the request for data. In one or more alternative embodiments, mapping component 156 can map the ID of the base station to the CDN node 501. At act 525, routing component 154 delivers the request for data and a service constraint indication, or QoS indication, based on at least one of the CDN node 501 or operational condition(s) thereof. At act 530, the CDN node 501 receives the request for data and delivers payload data according to the received service constraint indication. The payload data is delivered to base station 503, which transmits the payload data to the device 130 at act 535.

Figure 6:
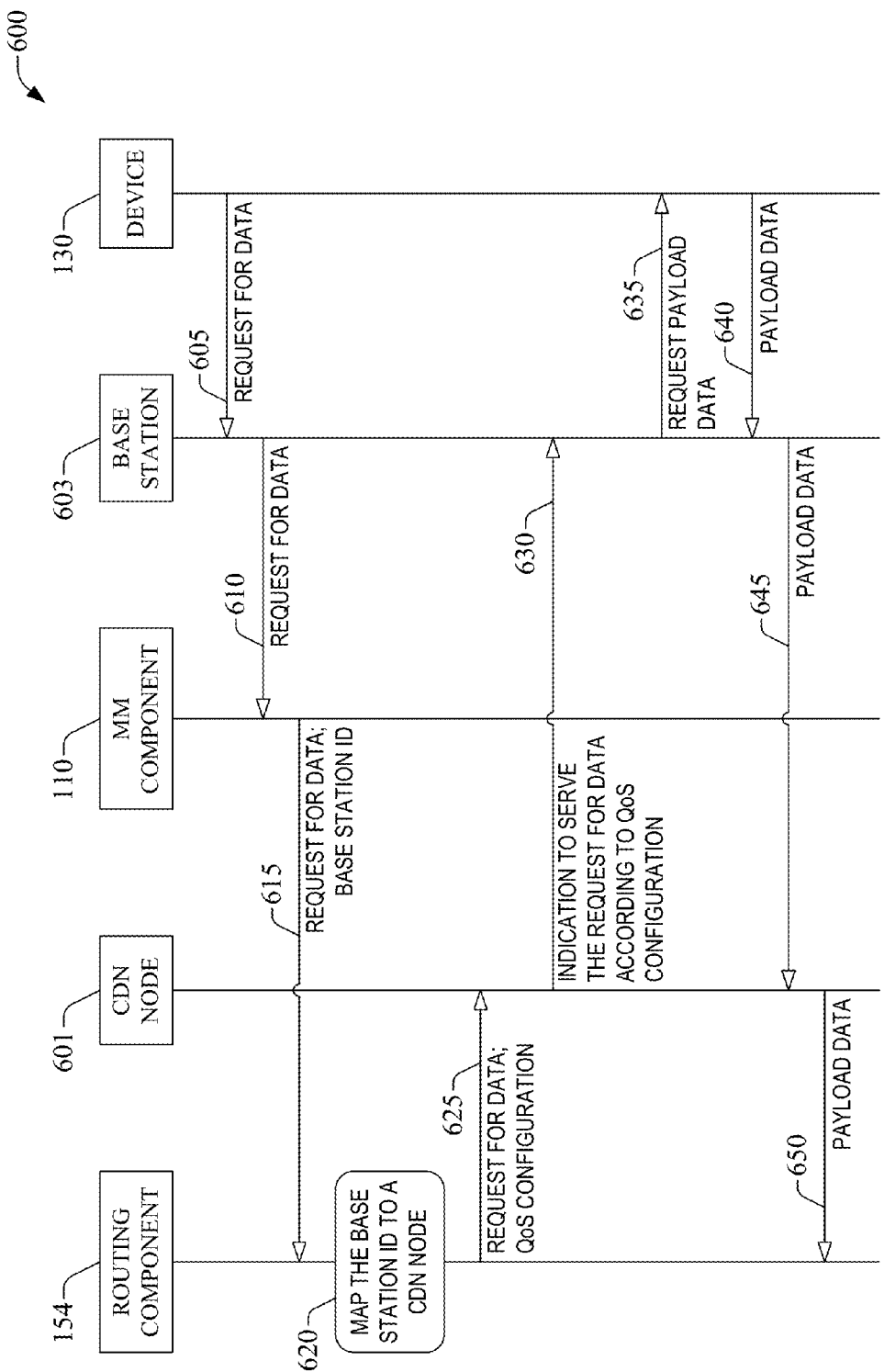
FIG. 6 illustrates a call flow of an example method for collecting data into a CDN according to aspects described herein.

FIG. 6 illustrates a call flow of an example method 600 for collecting, e.g., uploading, data into a CDN according to aspects described herein. Data can be collected from device 130, which delivers a request for data at act 605. The request for data is delivered to a base station 603 and includes a request to transmit payload data to the CDN. At act 610, base station 603 communicates the request for data to MM component 110, which relays, at act 615, the request for data and an identifier (ID) of the base station that delivered the request for data. The request for data and the ID of the base station 603 can be received at routing component 154, which at act 620 can map the ID of the base station to a CDN node 601 linked to the identified base station. In one or more alternative embodiments, mapping component 156 can map the ID of the base station to the CDN node 601. As described supra, the CDN node 601 can be in geographical proximity of the identified base station. In addition, routing component 154 can assign a QoS configuration or a service constraint indication based on at least one of the CDN node 601 or operational condition(s) thereof. At act 625, routing component 218 transmits the request for data and QoS configuration, or the service constraint indication, to CDN node 601. At act 630, CDN node 601 delivers an indication to serve the request for data according to the QoS configuration, or the service constraint indication. Such indication is delivered to the base station 603 that received the request for data from device 130. At act 635, the base station 603 communicates a request for payload data. In addition, the base station 603 can configure, or allocate, radio resources for telecommunication with device 130 according to the QoS configuration, to ensure a specific quality of service for receiving the payload data. In response to such request, device 130 conveys payload data at act 640. Base station 603 forwards the payload data to CDN node 601 at act 645. To retain the payload data in the CDN (e.g., CDN platform 150), CDN node 601 can deliver the payload data to routing component 154 at act 650.

Figure 7:
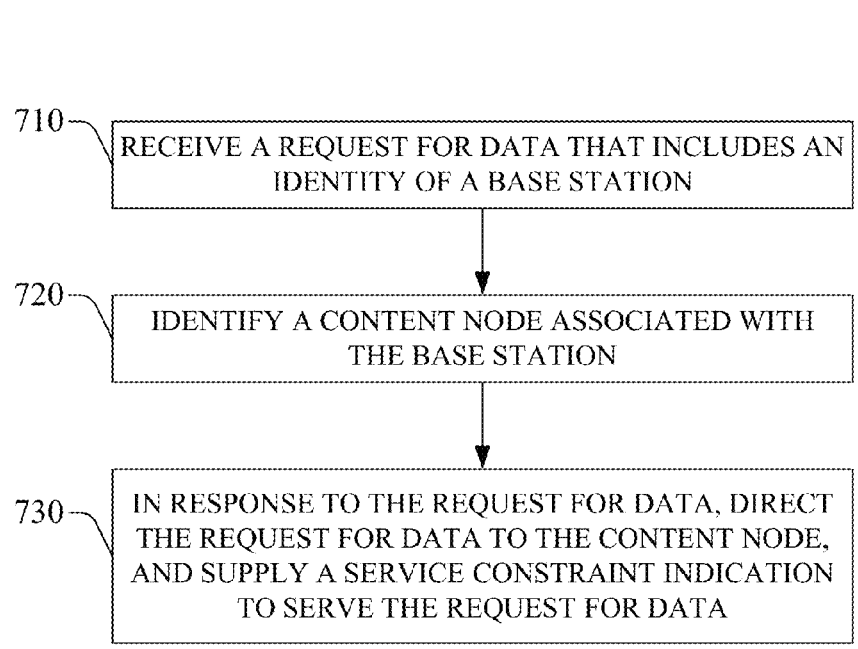
FIG. 7 is a flowchart of an example method for routing data in a CDN in accordance with aspects described herein.

FIG. 7 is a flowchart of an example method 700 for routing data in a CDN in accordance with aspects described herein. The subject example method can be implemented, at least in part, by one or more components within a CDN platform; e.g., routing component 154 and mapping component 156 can effect the subject example method 700. One or more processors also can be perform the subject example method. In an aspect, the one or more processors can provide, at least in part, the functionality of the routing component 154 or component(s) therein. In another aspect, the one or more processors can execute the routing component 154 and the mapping component 158, if the routing component 154 and the mapping component 156 are embodied in a set of code instructions, which can be part of a software application or a firmware application.

At act 710, a request for data that includes an identity, or identifier, of a base station is received. In an aspect, receiving the request for data includes receiving the request for data indirectly from a mobile device (see, e.g., FIGS. 5-6) that originates the request for data and communicates wirelessly with the base station. In another aspect, in one or more additional or alternative embodiments, the request for data may be received directly from the mobile device; for instance, depending on the architecture of a CDN platform (e.g., 150), the mobile device can wirelessly deliver the request for data to the CDN platform. As described supra, the identity or identifier can be at least one of a cell identification, a sector identification, or a logical address (e.g., IP address) for the base station. The request for data can be a request to consume, e.g., receive or download, content (e.g., web-based content). At act 720, a content node associated with the base station is identified; the content node is part of a set of nodes deployed within a content distribution network (CDN). In an aspect, the content node is identified through a predetermined mapping. The predetermined mapping establishes a relationship amongst the content node with one or more base stations provisioned and active to provide service to a mobile device; the relationship amongst the content node and the one or more base stations can be a one-to-one relationship or a one-to-many relationship. In another aspect, the content node identified through the mapping is located within a predetermined geographical distance from the base station; thus, identifying the content node includes selecting the content node in a content distribution network that is located within a predetermined geographical distance form the base station. At act 730, in response to the request for data, such request for data is directed, or routed, to the content node. In addition, a service constraint indication to serve the request for data is supplied. In a scenario, if the request for data is a request to consume data (e.g., content), the service constraint indication can be a QoS configuration (e.g., a QoS class, or a predetermined bit rate or upper bound or lower bound thereof) to deliver payload data solicited in the request for data. In an alternative scenario, if the request for data is a request to supply data (e.g., content), the service constraint indication can be a QoS configuration to receive payload data (e.g., content) associated with the request for data.

Figure 8:
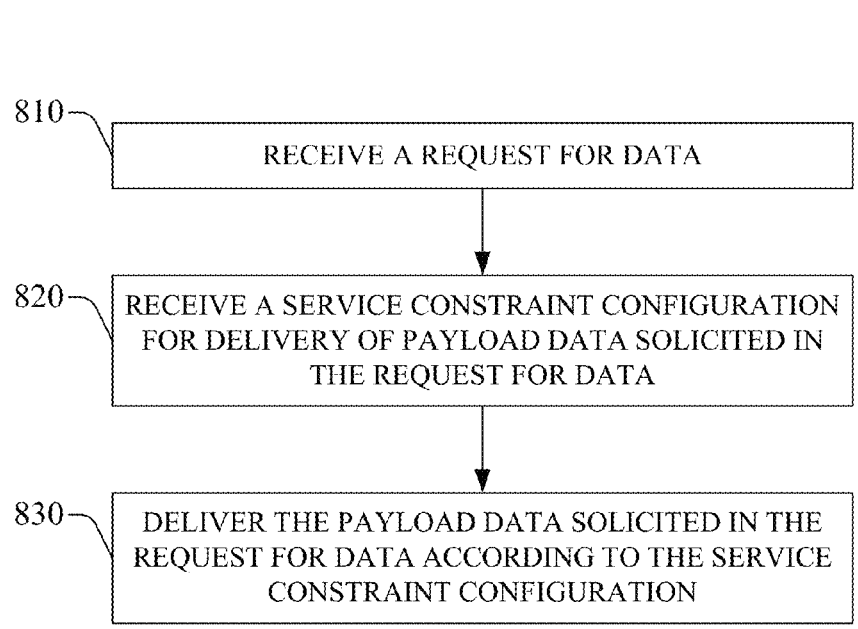
FIG. 8 is a flowchart of an example method for supplying data in a CDN in accordance with aspects described herein.

FIG. 8 is a flowchart of an example method 800 for supplying data in a CDN in accordance with aspects described herein. The subject example method 800 can be implemented, at least in part, by a CDN node, or component(s) therein. In addition or in the alternative, one or more processors also can be perform the subject example method 800. In an aspect, the one or more processors can provide, at least in part, the functionality of the CDN node, or component(s) therein. In another aspect, the one or more processors can execute at least a portion of the CDN node, or component(s) therein, if at least the portion of the CDN node, or the component(s) therein, are embodied in a set of code instructions, which can be part of a software application or a firmware application.

At act 810, a request for data is received. As described supra, the request for data can include an identity, or identifier, of a base station that serves (e.g., communicates wirelessly with) a mobile device that originates and delivers the request for data. The identity or identifier can be at least one of a cell identification, a sector identification, or a logical address (e.g., IP address) for the base station. In an aspect, receiving the request for data includes receiving the request for data directly or indirectly from the mobile device that originates and delivers the request for data. It is noted that while in one or more embodiments of a CDN node, or component(s) therein, that implement the subject example method 800, the request for data is received indirectly (see, e.g., FIG. 1 or FIG. 6), in additional or alternative embodiments, the request for data may be received directly from the mobile device. At act 820, a service constraint configuration (e.g., a QoS configuration) for delivery of payload data solicited in the request for data is received. In an aspect, the service constraint configuration can be based on operational condition(s), e.g., load, of the CDN node that can effect the subject example method 800. At act 830, the payload data solicited in the request for data is delivered according to the service constraint configuration. The subject act 830 can be part of an act of serving the request for data according to the service constraint indication if the request for data is a request to consume data; the one or more processors that can implement the subject example method 800 can carry out such serving act.

Figure 9:
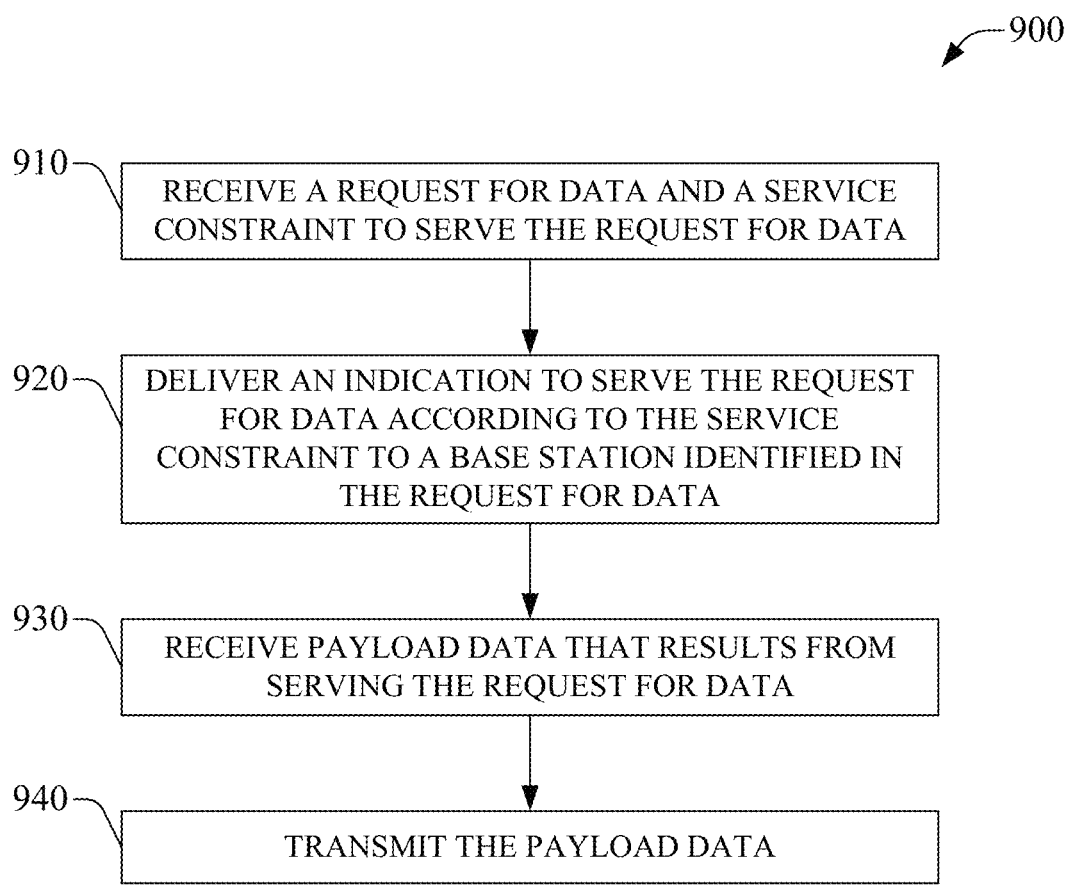
FIG. 9 is a flowchart of an example method for collecting, e.g., uploading, content into a CDN according to aspects of the subject disclosure.

FIG. 9 is a flowchart of an example method 900 for collecting, e.g., uploading, content into a CDN according to aspects of the subject disclosure. Component(s) that effect example method 800 also can effect the subject example method 900. In addition or in the alternative, one or more processors can be perform the subject example method 800. In an aspect, the one or more processors can provide, at least in part, the functionality of the CDN node, or component(s) therein. In another aspect, the one or more processors can execute at least a portion of the CDN node, or component(s) therein, if at least the portion of the CDN node, or the component(s) therein, are embodied in a set of code instructions, which can be part of a software application or a firmware application. At act 910, a request for data and a service constraint, or service constrain indication, to serve the request for data are received. In an aspect, the request for data can be a request to supply (e.g., upload) content, such as a digital file, which includes a file for specific applications that can be executed in a requestor device (e.g., 130), or a digital media file (video, picture, sound, etc.), or the like. The request for data can originate in a device that can communicate wirelessly with a base station. At act 920, an indication to serve the request for data according to the service constraint is delivered to a base station identified in the request for data. The subject act 920 can be part of an act of serving the request for data according to the service constraint, or service constraint indication, if the request for data is a request to supply data (e.g., content); the one or more processors that can implement the subject example method 900 can carry out such serving act. At act 930, payload data that results from serving the request for data is received. In an aspect, the payload data is received from the base station the communicates wirelessly with a device that delivers the request for data. At act 940, the payload data is transmitted. In an aspect, the payload data is transmitted to a CDN platform (e.g., 150).

Aspects, features, or advantages described in the subject specification can be exploited in substantially any wireless communication technology. For instance, 4G technologies, Wi-Fi, WiMAX, Enhanced GPRS, 3GPP LTE, 3GPP2 UMB, 3GPP UMTS, HSPA, HSDPA, HSUPA, GERAN, UTRAN, LTE Advanced. Additionally, substantially all aspects of the subject disclosure as disclosed in the subject specification can be exploited in legacy telecommunication technologies; e.g., GSM. In addition, mobile as well as non-mobile networks (e.g., internet, data service network such as internet protocol television (IPTV)) can exploit aspects or features described herein.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "data store," "storage," "data storage," "database," "cache," "data cache," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Various aspects or features described herein can be implemented as a method, apparatus, or article of manufacture using standard programming and/or engineering techniques. In addition, various aspects disclosed in the subject specification can also be implemented through program modules stored in a memory and executed by a processor, or other combination of hardware and software, or hardware and firmware. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical discs (e.g., compact disc (CD), digital versatile disc (DVD), blu-ray disc (BD) . . . ), smart cards, and flash memory devices (e.g., card, stick, key drive . . . ).

What has been described above includes examples of systems and methods that provide advantages of the subject disclosure. It is, of course, not possible to describe every conceivable combination of components or methodologies for purposes of describing the subject disclosure, but one of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method, comprising:
receiving, by a system comprising a processor, a request for a portion of data, wherein the request specifies an identity of a base station device of base station devices and a service constraint, wherein the service constraint is a function of a communication cost objective; and
in response to the receiving the request for the portion of the data:
identifying, by the system, a content distribution network node device that comprises a capability to satisfy the service constraint based on a look-up data structure, wherein the look-up data structure comprises mappings between content distribution network node devices and base station devices of the base station devices, and the mappings comprise a one-to-many relationship between one of the content distribution network node devices and the base station devices and comprise associations of the base station devices to node devices of the content distribution network node devices that are within a defined geographical proximity to the base station devices, and
transmitting, by the system, the request for the portion of the data to the content distribution network node device.

2. The method of claim 1, wherein the content distribution network node devices are configured to receive and convey a variety of data of different data types.

3. The method of claim 1, wherein the identifying the content distribution network node device further comprises identifying the content distribution network node device that is geographically closest to the base station device.

4. The method of claim 1, wherein the receiving comprises receiving the request from a device that communicates wirelessly with the base station device.

5. The method of claim 1, wherein the mappings comprise further associations between respective internet protocol addresses of the content distribution network node devices and respective identifiers of the base station devices.

6. A system, comprising:
a processor; and
a memory that stores executable instructions that, when executed by the processor, facilitate performance of operations, comprising:
receiving a request for an item of content, wherein the request specifies an identity of a base station device of base station devices and a service constraint, wherein the service constraint is a function of an objective based on a predetermined bit rate for transmission; and
in response to receiving the request for the item of the content:
selecting a content distribution network device that is geographically closest to the base station device and is able to satisfy the service constraint based on mappings between content distribution network devices and base station devices of the base station devices, wherein the mappings comprise a one-to-many relationship between one of the content distribution network devices and the base station devices, and
sending, by the system, the request for the item of the content to the content distribution network device.

7. The system of claim 6, wherein the content distribution network devices are configured to receive and supply the content.

8. The system of claim 6, wherein the mappings further comprise associations of the base station devices to devices of the content distribution network devices that are in a defined geographical proximity to the base station devices.

9. The system of claim 6, wherein the operations further comprise receiving the request for the item of the content from a device that communicates wirelessly with the base station device.

10. The system of claim 6, wherein the mappings further comprise associations between respective internet protocol addresses of the content distribution network devices and respective identifiers of the base station devices.

11. A machine-readable storage device, comprising executable instructions that, when executed by a processor, facilitate performance of operations, comprising:
receiving a request for content of various content, wherein the request specifies an identity of a base station device of base station devices and a service constraint, wherein the service constraint is a function of a cost objective for a communication;
determining a content distribution network node device to fulfill the request that has an ability to provide a service satisfying the service constraint based on a data structure, wherein the data structure comprises mappings between content distribution network node devices and base station devices of the base station devices, and the mappings comprise a one-to-many relationship between one of the content distribution network node devices and the base station devices and comprise associations between respective internet protocol addresses of the content distribution network node devices and respective identifiers of the base station devices, and wherein the content distribution network node devices comprise the content distribution network node device; and
forwarding the request for the content to the content distribution network node device to fulfill the request.

12. The machine-readable storage device of claim 11, wherein the content distribution network node devices are configured to receive and supply the various content.

13. The machine-readable storage device of claim 11, wherein the mappings further comprise associations of the base station devices to respective ones of the content distribution network node devices that are in a defined geographical proximity to the base station devices.

14. The machine-readable storage device of claim 11, wherein the satisfying the request for the content further comprises identifying the content distribution network node device that is geographically closest to the base station device.

15. The machine-readable storage device of claim 11, wherein the receiving comprises receiving the request from a transmission device that communicates wirelessly with the base station device.

16. The method of claim 1, wherein the function relates to a lowest communication cost to fulfill the request.

17. The method of claim 1, wherein the service constraint further relates to satisfaction of a quality of service class.

18. The system of claim 6, wherein the function relates to a lowest communication cost to fulfill the request.

19. The system of claim 6, wherein the service constraint further relates to satisfaction of a bit rate for transmission.

20. The machine-readable storage device of claim 11, wherein the function relates to a lowest communication cost to fulfill the request.

* * * * *